US012579092B2

(12) United States Patent (10) Patent No.: US 12,579,092 B2
Strunkmann (45) Date of Patent: Mar. 17, 2026

(54) APPARATUS FOR CONNECTING A FIELD DEVICE TO A CONTROL SYSTEM

(71) Applicant: Turck Holding GmbH, Halver (DE)

(72) Inventor: Peter Strunkmann, Detmold (DE)

(73) Assignee: Turck Holding GmbH, Halver (DE)

( * ) Notice: Subject to any disclaimer, the term of this patent is extended or adjusted under 35 U.S.C. 154(b) by 0 days.

(21) Appl. No.: 18/754,229

(22) Filed: Jun. 26, 2024

(65) Prior Publication Data

US 2025/0004969 A1 Jan. 2, 2025

(30) Foreign Application Priority Data

Jun. 27, 2023 (DE) ..................... 10 2023 116 914.9

(51) Int. Cl.
*H04L 12/10* (2006.01)
*G06F 13/40* (2006.01)
*H04L 12/40* (2006.01)

(52) U.S. Cl.
CPC .... *G06F 13/4022* (2013.01); *H04L 12/40045* (2013.01); *H04L 2012/4026* (2013.01)

(58) Field of Classification Search
CPC .................................................. G06F 13/4022
See application file for complete search history.

(56) References Cited

U.S. PATENT DOCUMENTS

2009/0172207 A1 7/2009 Remaker et al.
2020/0080916 A1* 3/2020 Linne .................... F16C 19/527

2021/0144877 A1* 5/2021 Lessmann ......... H04L 12/40169
2022/0327076 A1* 10/2022 Magyar ................. G06F 13/362
2022/0337450 A1 10/2022 Walther
2023/0029588 A1* 2/2023 Liu ......................... H01H 19/14
2023/0123088 A1* 4/2023 Müller .................... H04L 12/66
370/401

FOREIGN PATENT DOCUMENTS

DE 10 2019 110 592 A1 10/2020
DE 10 2019 127 195 A1 4/2021
DE 10 2020 102 239 A1 8/2021
DE 10 2021 118 268 B3 11/2022

OTHER PUBLICATIONS

Search Report issued in DE 10 2023 116 914.9, to which this application claims priority, mailed Mar. 5, 2024 (English-language machine translation attached).
Extended European Search Report issued in EP 24 184 007.3, which is a counterpart hereof, mailed Dec. 9, 2024 (English-language machine translation attached).

* cited by examiner

*Primary Examiner* — Tim T Vo
(74) *Attorney, Agent, or Firm* — Pearl Cohen Patentanwälte PartGmbB; Michael McCandlish

(57) ABSTRACT

Apparatus for connecting a field device to a control system, the apparatus comprising a control interface for establishing a data connection to the control system; a field-device port for establishing a connection to the field device for data transmission and power transmission, the field-device port having at least three pins; a microprocessor; a physical layer for ground-referenced communication signals; and a further physical layer for non-ground-referenced communication signals; wherein the field-device port is designed such that the field device can be connected for ground-referenced communication signals and for non-ground-referenced communication signals.

13 Claims, 3 Drawing Sheets

APPARATUS FOR CONNECTING A FIELD DEVICE TO A CONTROL SYSTEM

CROSS REFERENCE TO RELATED APPLICATIONS

This application claims priority to German patent application 10 2023 116 914.9 filed on Jun. 27, 2023, which is hereby incorporated by reference in its entirety.

TECHNICAL FIELD

The present disclosure relates to an apparatus for connecting a field device to a control system. It also relates to a plug for connecting to a field-device port of an apparatus of said type and relates to a set (kit of parts) comprising an IO-Link plug socket and a plug. It relates also to a method for operating an apparatus for connecting a field device to a control system.

BACKGROUND

In the technical field of PTP data transfer (point-to-point connection), the transfer of ground-referenced communication signals, for instance IO-Link in industrial automation, is an important technical standard that specifies the communication by central control components with sensors and actuators.

For example, a three-core cable containing two conductors for the voltage supply and one conductor for the data transfer or communication serves as the physical interface. IO-Link interfaces, optionally also plugs and sockets for sensors and actuators, are standardized; see IEC 61131-9.

With the new developments in the transfer of non-ground-referenced, purely differential communication signals, for instance by means of Single Pair Ethernet (SPE), for example using the IEEE standards (IEEE 802.3bw, IEEE 802.3cg or IEEE 802.3 bp), there is also a simple physical interface available that is suitable for sensors and actuators and facilitates high data rates while simultaneously allowing direct access to higher protocol layers of the Ethernet without a gateway (IO-Link master).

Optionally, Advanced Physical Layer (APL) and Power over Dataline (PoDL) SPE can be used to transmit on the same two conductors used to supply voltage to the field device. The field device can also be referred to simply as a device and can comprise a sensor and/or actuator, for example. APL provides a specific single-pair Ethernet based on 10BASE-TIL (in accordance with IEEE 802.3cg) with additional stipulations for the process industry. Ethernet APL communication is based on 10 Mbit/s full-duplex communication carried over a twisted-pair cable.

At present, a plant operator must decide on one of the aforementioned operating modes for the various smart sensors and actuators. For example, the advantages of SPE components, for example, cannot be introduced into an existing IO-Link environment on a case-by-case basis and vice versa. In addition, suppliers of smart sensors and actuators must stock all variants. This is costly and a huge economic drawback.

DE 10 2021 118 268 B3 discloses a dual-purpose functional element. The functional element can be connected to an IO-Link network or to a network that uses SPE.

One object of the present disclosure can be to provide an improved apparatus, by means of which field devices can be connected to a control system. The apparatus can be designed to allow the use of field devices designed to use non-ground-referenced communication signals, for instance Single Pair Ethernet (signal processing element), and also field devices designed to use ground-referenced communication signals, for instance IO-Link.

SUMMARY

An apparatus for connecting a field device to a higher-level control system comprises a control interface for establishing a data connection to the control system, optionally via a databus, for instance by means of an Ethernet connection. It also comprises a field-device port, which has at least three pins, for establishing a connection to the field device for data transmission and power transmission, for instance via an IO-Link network. The apparatus also comprises a microprocessor. It comprises a physical layer for ground-referenced communication signals, optionally a physical IO-Link layer, referred to below as "PHY IO-Link", and a further physical layer for non-ground-referenced communication signals, optionally an SPE layer, referred to below as "PHY SPE". The field-device port is designed such that the field device can be connected for ground-referenced communication signals and for non-ground-referenced communication signals.

The apparatus makes it possible for a functional element or field device to connect to a control system, and facilitates interaction or communication with this control system. The control system can comprise, for example, a databus or a bus network, for instance for the automation and open-loop and closed-loop control of sensor components and functional components.

This means that the field-device port can be set up such that it is possible to connect, for example, a classical IO device with which data is transmitted via ground-referenced communication signals, and also another device for which the data transmission is performed via non-ground-referenced communication signals, for instance by means of SPE.

The apparatus can be designed to be an IO master, which is connected to the higher-level control system, for example via a databus, and to which can be connected one device or a plurality of devices by means of IO-Link. Both "classical" IO-Link using ground-referenced communication signals and "modernized" IO-Link using non-ground-referenced communication signals, also referred to below as "IO-Link via Ethernet", can be used here. In this manner, IO devices for different types of communication signals can be connected to the same field-device port.

In addition, the apparatus can comprise a power input for supplying electrical power. Alternatively, the apparatus can be supplied with electrical power by means of Power over Data Line (PoDL).

The apparatus can be set up for connection of a field device comprising an actuator head and/or a sensor head. Optionally, what is known as a smart sensor and/or a smart actuator can be provided. A smart sensor can refer optionally to a sensor with which it is possible to read out not only a measurement quantity but also, for example, settings, diagnostic data and identification data.

The field device can comprise a plug socket, which has at least three pins, for the connection to the apparatus and for data-communication with, and supply to, the field device via an IO-Link network.

Thus, for example, a device can be provided that allows sensors and actuators in automation engineering based on the IO-Link standard to be connected to a combination of different physical layers. For instance, this makes it possible to operate on a shared IO master IO-Link sensors and actuators having different physical communication layers, for example classical IO-Link and a "modernized" IO-Link, for instance known as "IO-Link via Ethernet". An IO-master port here can support two or more physical communication modes, e.g., classical IO-Link and an IO-Link via Ethernet.

When a further physical layer, optionally Single Pair Ethernet, SPE (IEEE_802.3cg_2019), is added to the classical IO-Link protocol, the classically specified communication methods can be ported onto the physical SPE environment in a manner that is compatible with IO-Link. This can make it possible, for example, to work with larger amounts of data that can be transmitted faster over longer lines.

The apparatus now can allow both physical layers to be offered in one device, so that the user no longer has to decide between two master types in order to communicate with, and supply electrical power to, a classical IO-Link field device or a field device via SPE. Thus, the user can also work in a mixed mode and can migrate slowly to the new type of IO-Link connections. It can be intended that both field devices using classical IO-Link and field devices using SPE can be connected to, and operated on, the same IO-Link port, optionally having an M12 socket or an M8 socket. The same apparatus can be used to connect the field devices and the IO-Link network to a databus and optionally to a fieldbus, for instance Profinet, Ethernet/IP or Modbus/TCP.

A configuration for communication with, and supply to, the field device by means of ground-referenced communication signals can be provided, for instance an IO-Link or IO-Link network. For simplicity, the term "IO-Link" or "IO-Link network" is used below to refer quite generally to a ground-referenced exchange of communication signals, optionally for point-to-point signal/data exchange.

In addition, a configuration can be provided that uses a further physical layer in which a non-ground-referenced exchange of communication signals takes place; this refers optionally to a purely differential communication signal. Optionally, a physical SPE layer (PHY SPE) is provided for this purpose. As opposed to the aforementioned ground-referenced exchange of communication signals by means of the PHY IO-Link, in the case of the non-ground-referenced exchange of communication signals there can be no ground reference because only two conductors/lines are provided, and the signal can be obtained from the differential voltage between these two lines. For simplicity, the terms "SPE", "PHY SPE" and the like can be used below to refer to a non-ground-referenced exchange of communication signals and to the associated components.

For example, an SPE solution by means of 10BASE-T1L can be provided. Other solutions can be provided, e.g. using 100 Mbit/s or using an external voltage supply, such as PoDL class 11/12 or APL.

There can be different configurations in order to ensure that the apparatus, optionally as an IO master, can be used with ground-referenced as well as non-ground-referenced communication signals.

In an example, a switch can be provided in the apparatus in order to switch between the use of the different types of communication signals. PoDL is not provided optionally in this case.

In an example, a switching element can be provided between the physical layer for ground-referenced communication signals and the further physical layer for non-ground-referenced communication signals. In this case, the apparatus can be set up so that, according to a received communication signal and/or a plug used for the field-device port and/or received communication data and/or a type of supply to the field-device, it drives the switching element in such a way that the switching element switches either to the physical layer for ground-referenced communication signals or to the physical layer for non-ground-referenced communication signals, so that the data connection to the field device can be established via the appropriate physical layer.

The switching element can be an electronic switch, an analog switch or a semiconductor switch, for example having at least one field effect transistor and/or bipolar transistor.

The switchover can be performed automatically by recognition of the type of a connected field device and determining a suitable operating mode of the apparatus. Alternatively or additionally, the switchover can be performed on the basis of a configuration by a user, that adapts a type of connection on the apparatus to the intended field device.

Optionally, a plug socket and optionally the associated line paths are also designed for connecting to a Single Pair Ethernet (SPE). The switching element between the physical layers can switch, for example, according to the particular plug inserted into the plug socket and hence also according to the particular communication data being received and/or the supply type/characteristics.

Optionally, the switching element can establish a conductive connection to a physical IO-Link layer or to a physical SPE layer.

The switching element can be connected via a line directly to the microprocessor, wherein the microprocessor can control, in addition to the operation of the actuator head or sensor head, also the functions of the switching element according to, as mentioned above, the inserted plug and/or the received communication data or the supply type, optionally the applied voltage.

The switching element can be connected via a line directly to the microprocessor, wherein the microprocessor can be set up to control the function of the switching element according to the received configuration signal and/or the plug used and/or the received communication data and/or the supply type to the field device.

The microprocessor can be connected via the line directly to a pin of the plug socket, optionally to one of precisely two communication pins. Hence, in the initial or normal position, the connection can be set appropriately for receiving a base voltage (supply), as is the case for SPE, and, on recognizing an IO-Link plug, can be switched to the appropriate layer without the components experiencing damage or overvoltage loads.

The apparatus can be set up to supply the field device with electrical power via a first conductor pair, and to establish the data connection via a second conductor pair. In this case, the field-device port can be set up to supply the field device with electrical power via two pins (P1, P3). The field-device port can also be set up to connect two further pins (P2, P4) as C/Q, and optionally with a function such as DI/DO, for ground-referenced communication signals, or as DL+ and DL− for non-ground-referenced communication signals.

For example, provision is made to use 10BASE-T1L with a separate voltage supply, i.e. without PoDL, for the non-ground-referenced communication signals. The result can be a "hybrid solution" for the two types of data transmission. Thus, for instance, two separate conductor pairs can be used to supply the field device with data and power. For example, Pin 1 and Pin 3 known from a classical IO-Link master can be used both for the supply of the classical IO-Link device and for the IO-Link-via-Ethernet device. Pin 4 and Pin 2 can then be used either as C/Q, with the optional DI/DO function, for the classical IO-Link connection, or they are connected as DL+ and DL− for IO-Link via Ethernet or SPE.

In an example, 10BASE-TIL and the PoDL class 11/12 power supply can be used.

The apparatus can be set up to supply electrical power to the field device via a first conductor pair, optionally via two pins (P1, P3). In this case, optionally for non-ground-referenced communication signals, the apparatus can be set up to establish the data connection likewise via the first conductor pair, optionally via the two pins (P1, P3). Optionally, the apparatus can also be set up to establish for ground-referenced communication signals the data connection via a further conductor, optionally via a further pin (P4), wherein the further pin (P4) can be connected optionally as C/Q.

In this case, for example, the IO-Link device can be supplied with power and communication using just one conductor pair. In this case, Pin 1 and Pin 3 of the apparatus, which is in the form of a classical IO-Link master for instance, can be responsible also for communication by Single Pair Ethernet SPE in addition to the existing task of supplying power. Pin 4 (C/Q) can continue to be reserved for use with the classical IO-Link. This means that an apparatus in the form of an IO-Link master can communicate with a classical IO-Link device via Pin 4 in a ground-referenced manner. It is also possible, however, for the apparatus to "talk" or communicate via Pins 1 and 3 in a non-ground-referenced manner, for instance via "IO-Link via Ethernet", with an IO-Link-via-Ethernet device designed for SPE. In both cases, the supply can be made via Pins 1 and 3; in the case of the classical IO-Link using 24V and GND; in the case of IO-Link via Ethernet using PoDL and the circuits specified for SPE/PODL.

The SPE layer and the IO-Link layer can work in parallel, and communication signals can be exchanged on both paths. For this purpose, two pins can be provided for power transmission and for communication via SPE, for instance for APL. This can be done by combining the physical layer for SPE, PHY SPE, with a Power over Data Line, PoDL, voltage supply, with both pins acting as supply pins for the IO-Link device and able to provide the supply voltage. Since the data signal transmitted simultaneously by means of IO-Link has the same ground reference at the transmitter end and receiver end, the IO-Link data signal can be conducted via a further (pure) data or communication pin. The additional circuit then can comply with the standard. In this layout, both protocols can be used in parallel, or just the protocol for which communication is (first) set up.

The communication via IO-Link and SPE can hence also take place in parallel, so that at least some of the data can be transferred redundantly and with high diversity.

The redundant structure can have the advantage that a high level of safety does not have to be achieved for the individual paths, but instead standard components and standard firmware can be employed. Safety is only achieved by the redundant structure and by monitoring for conformity of the safety-related data.

100BASE-TIL (100 Mbit/s), IEEE802.3dg or 10BASE-TIS, for example, can be suitable for the non-ground-referenced communication.

Similar to the aforementioned combinations, non-ground-referenced communication via APL, for example, can be implemented together with ground-referenced, classical IO-Link.

The apparatus can be set up to drive the first conductor pair, optionally the two pins (P1, P3), in such a way that the field device is supplied with electrical power by a voltage of 24 V and GND in the case of ground-referenced communication signals, and by means of Power over Dataline, PoDL, or via Single Pair Ethernet/Power over Dataline, SPE/PoDL, in the case of non-ground-referenced communication signals.

Thus, the apparatus can be set up to supply the field device with voltage via two pins (P1, P3), and to implement in parallel via the same two pins (P1, P3) non-ground-referenced data transfer, optionally via SPE. In this case, the apparatus can also be set up to implement ground-referenced data transfer via a third pin P4, optionally a communication pin, optionally by means of an IO-Link connection in parallel with the SPE data transfer. These two forms of data transfer are provided optionally simultaneously, for instance as redundant parallel data transfer.

The microprocessor can be conductively connected via the line directly to a pin (P1, P2, P3, P4), optionally to a communication pin (P2, P4).

In an example, the field-device port can comprise a plug socket in the form of an IO-Link plug socket in accordance with standard 61131-9, optionally having a three-pin or four-pin design.

In an example, the field-device port can comprise a plug socket designed for mechanically and conductively connecting to a plug. The plug socket can have at least four pins, optionally conforming to the IO-Link standard, comprising two pins for data transmission and two pins for power transmission, optionally for an IO-Link connection. The plug socket can also be suitable for two-pin connection to an SPE plug for a twisted-pair cable of Single Pair Ethernet (SPE), wherein the SPE plug can be conductively connected to the two pins for communication. The plug socket of the plugs can also be form-fittingly connected to an IO-Link plug.

The plug for connecting to a field-device port of an apparatus according to one of the preceding claims, optionally for connecting the apparatus to the field device via Single Pair Ethernet, SPE, optionally with power transmission via SPA, can have at least one non-conducting, form-fitting mating element to a pin of the field-device port.

The plug can thereby be connected form-fittingly to the plug socket, even though individual pins of the plug socket are not meant to be conductively connected to the field device because they are not needed for an SPE connection. The plug can thereby be used for an SPE connection to the field device even if the plug socket has additional pins for IO link connections. This can also achieve additional stability.

The plug is designed optionally for the apparatus described here. It therefore has the same advantages and can be developed in an analogous manner.

The set or "kit of parts" can comprise, optionally consist of, an IO-Link plug socket and a plug. The IO-Link plug socket can comprise a four-pin design and can be in accordance with the IO-Link standard, having at least one pin for ground-referenced data transmission and two pins for power transmission, wherein the plug as an SPE plug for a twisted-pair cable of Single Pair Ethernet (SPE) can have a two-pin design, wherein the plug can be conductively connected to the two pins of the IO-Link plug socket that are for power transmission.

Optionally, the plug can be form-fittingly connected to the IO-Link plug socket. In addition, the plug can be designed to be connected in a latchable manner to the IO-Link plug socket.

The set can be designed for use with the apparatus described here. It therefore can have the same advantages and can be developed in an analogous manner.

A method for operating an apparatus for connecting a field device to a higher-level control system comprises the steps:

establishing a data connection of the apparatus to the control system, optionally via a databus, for example by means of an Ethernet connection;

connecting the field device to the apparatus via a plug-in connection, which is composed of a plug socket of the apparatus and a plug, by a cable for data transmission and power transmission between the apparatus and the field device;

recognizing a type of communication signals that can be used for the field device, optionally ground-referenced communication signals as in the case of IO-Link, or non-ground-referenced communication signals as in the case of SPE;

adjusting, according to the recognition, the apparatus for data transmission by means of a physical layer for ground-referenced communication signals, for example via an IO-Link network, or by means of a physical layer for non-ground-referenced communication signals, for example via an SPE network.

The method can be designed to operate the apparatus described herein. It therefore can have the same advantages and can be developed in an analogous manner.

In an implementation of the method, the field device can be connected to the apparatus by means of the above-described set composed of an IO-Link plug socket and a plug.

In the case of data transfer with PoDL, which can be the case with SPE, for example, it can be critical when cyclical shutdowns are required for safety reasons, because then open-loop and closed-loop control signals cannot be forwarded. Therefore, a method variant can be proposed in which safety-related communication is performed by the following steps:

The communication by means of IO-Link and SPE protocol is set up in parallel.

Data can be transferred in parallel and compared.

Optionally, safety-related data can be transferred cyclically in both protocols, and this safety-related data is evaluated in a cross-comparison. If the safety-related data does not match, a safe state is initiated consisting in a voltage reduction or shutdown.

Optionally, the voltage can be supplied via two pins; optionally, one or more further pins can be provided purely for the voltage supply. The SPE data transfer is performed via two of the supply pins, while the IO-Link data transfer takes place in parallel with the SPE data transfer simultaneously via a further pin (communication pin), which is not a supply pin for power transmission.

Different categories of the parallel data transmission can be defined. These are optionally a "standard category", in which data is transferred by means of IO-Link and SPE at least in part redundantly, and evaluated. A further category can constitute a "special category", which is selected optionally for monitoring and during faults, for instance situations where voltage and/or current is lost, with only monitoring data and/or safety-related data being transferred via an IO-Link connection, which can be operated independently of a voltage supply. As a further category, in addition to the redundancy mentioned, operation can take place via only one of the two systems (SPE/IO-Link), given an identical voltage supply. A distinction can be made in advance, provided it is certain that the data does not have to be evaluated in relation to safety.

The special category can be performed in parallel with the standard category as a cycle or frequency in a defined duration and/or periodicity.

Optionally, the field device can be connected to the apparatus by a plug/plug-socket set according to one of the aforementioned implementations.

It can be hence possible to use the same apparatus, optionally the same IO-Link master, to drive a sensor and/or actuator by means of SPE and IO-Link, by the apparatus having a plug socket that comprises two data pins for the data forwarding and at least two pins for the voltage supply (voltage pins). The data pins act either as DL+ or DL− (data line + and −) for the non-ground-referenced SPE transmission, or as a communication channel (C/Q, optionally for the ground-referenced IO-Link communication) with an optional further data channel when used as an IO-Link.

The apparatus can independently determine whether a connection to a field device exists via SPE or IO-Link/SIO (IO-Link/standard input and output). The plug socket is in the form of a hybrid SPE/IO-Link socket.

As far as government or industry standards or protocols are referenced herein, the standard or protocol in effect on the filing date and/or priority date of this application is meant.

BRIEF DESCRIPTION OF THE DRAWINGS

Optional details and optional advantages of the disclosure are explained with reference to the drawings for illustrative purposes, in which.

DESCRIPTION

Figure 1:
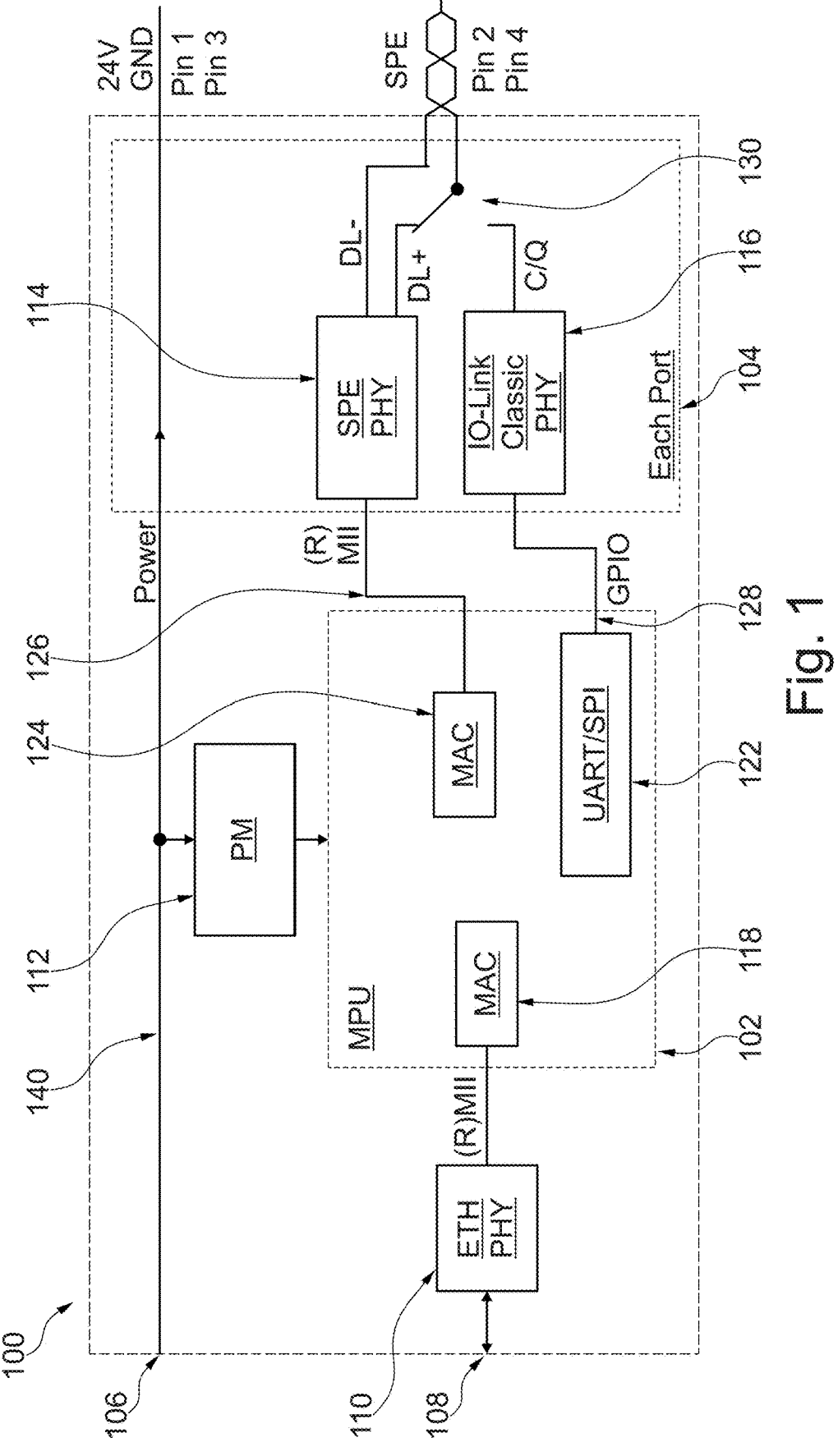
FIG. 1 shows a sketch of the circuitry of a first exemplary implementation of the apparatus.

Neither the drawing/figures nor the description thereof is intended to limit the scope of the disclosure in any way.

A sketch of the circuitry of a first exemplary implementation of the apparatus is explained with reference to FIG. 1.

The apparatus 100 has a power input 106 for supplying electrical power ("Power In").

Figure 3:
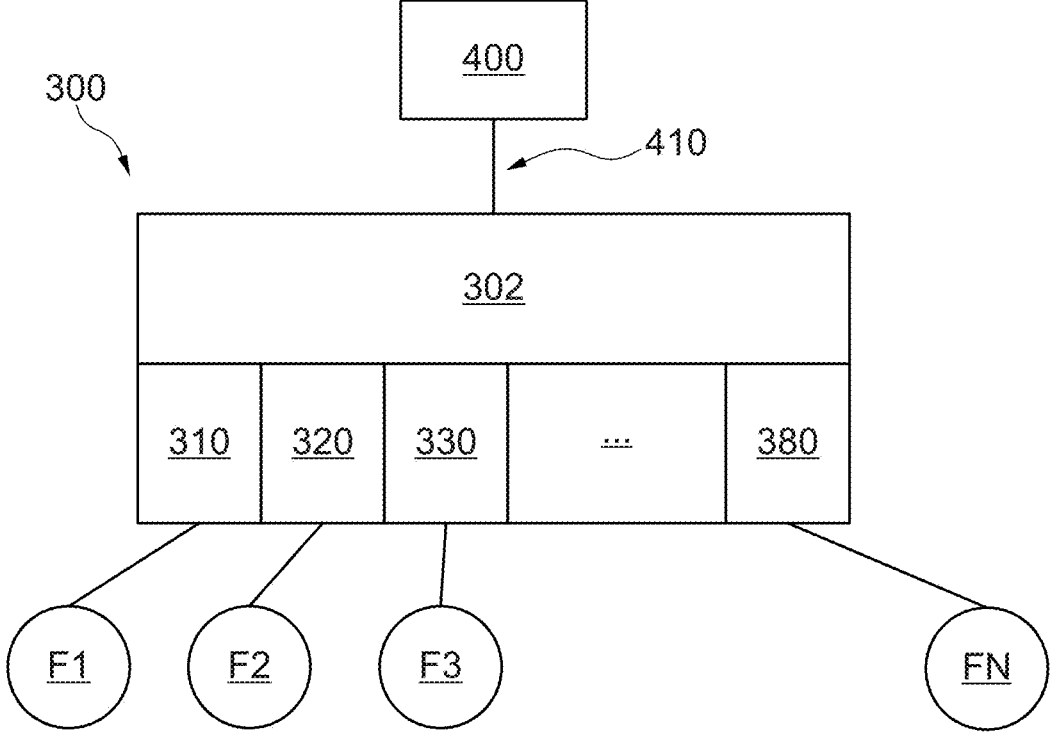
FIG. 3 shows a sketch of a network containing a higher-level control system, an apparatus and field devices.

The apparatus 100 also has a control interface 108, which can be connected to a higher-level control system; see for instance the higher-level control system 400 shown in FIG. 3. In the present case given by way of example, the control system 400 is connected via a databus 410 to the apparatus 100, 200, 302, which is in the form of an Ethernet connection 410 here.

In order to establish and operate the data connection to the databus 410 by means of Ethernet, in the example of the apparatus 100, a physical layer ETH-PHY 108 is provided, via which is implemented the interface to the databus 410.

The apparatus 100 of the example further comprises a port (not shown), optionally a plug socket, for connecting to the databus 410 by means of a cable. Optionally, a plug type used as standard for Ethernet connections is provided; alternatively or additionally, a wireless interface can be provided.

The apparatus 100 also has a field-device port 104, which is shown by four conductors or pins P1, P2, P3, P4.

The apparatus 100 has a control unit 102 in the form of a microprocessor unit (MPU). This control unit 102 is optionally in the form of an Ethernet switch, which is configured for the described functionalities of the apparatus 100.

A PM module 112 (power management, PM) is connected via a line 140 to the control unit "MPU" 102 and to the power supply "Power In" 106. The power supply of a connected field device, for instance shown in FIG. 3 as a field device F1, F2, F3, Fn, can be controlled via the PM module 112, which in addition can be controlled via the control unit MPU 102.

The connection to one or more field devices F1, F2, F3, Fn can be made via corresponding field-device ports 104, 204, 310, 320, 330, 380, optionally with wired connections being provided.

Optionally, for each field-device port 104 or port of the apparatus 100 at least one physical layer "IO-Link Classic PHY" 116 for ground-referenced communication signals and one physical layer "SPE PHY" 114 for non-ground-referenced communication signals are provided.

Optionally, the physical layer "SPE PHY" 114 of each port 104 is connected via an (R) MII interface 126 (reduced media-independent interface, RMII) to a MAC module 124 assigned to the port 104.

Optionally, it is also provided that the physical layer ",IO-Link Classic PHY" 116 is connected via a GPIO interface 128 (General Purpose Input/Output) to the UART/SPI module 122 of the control unit MPU 102.

The case shown in FIG. 1 corresponds to an exemplary implementation in which is implemented optionally 10BASE-TIL with a separate supply, i.e. without PoDL. In this respect it is effectively a "hybrid" implementation.

In the example, the apparatus 100 can be operated optionally as an IO master, while the field devices F1, F2, F3, Fn can be operated as IO-Link devices.

In this example of the apparatus 100, each connected field device F1, F2, F3, Fn is supplied with power or communication via two conductor pairs. Optionally, the pins "Pin 1" and "Pin 3" of the apparatus 100 are responsible for the supply to the field devices F1, F2, F3, Fn regardless of whether a classical IO-Link device for ground-referenced communication or another IO-Link device for non-ground-referenced communication is used.

The pins "Pin 2" and "Pin 4" are used in this exemplary implementation for the data transmission. The driving of these pins is adjusted according to whether a field device F1, F2, F3, Fn connected to the associated port 104 is set up for ground-referenced or non-ground-referenced communication.

For the purpose of adjusting the drive a switching element 130 is provided, which can be switched between a connection to the physical layer "SPE PHY" 114 and the physical layer "IO-Link Classic PHY" 116.

In the case of ground-referenced communication, for instance via IO-Link-Classic, "Pin 2" and "Pin 4" are switched by the switching element 130 in accordance with the applicable standards in order to act as "C/Q", optionally with a function such as "DI/DO". They then are connected to the physical layer ",IO-Link-Classic PHY" 116.

In the case of non-ground-referenced communication, for instance via SPE or another Ethernet connection, they are switched by the switching element 130 in accordance with the applicable standards as "DL+" and "DL−". In this case, a connection is made optionally to the physical layer "SPE PHY" 114.

Figure 2:
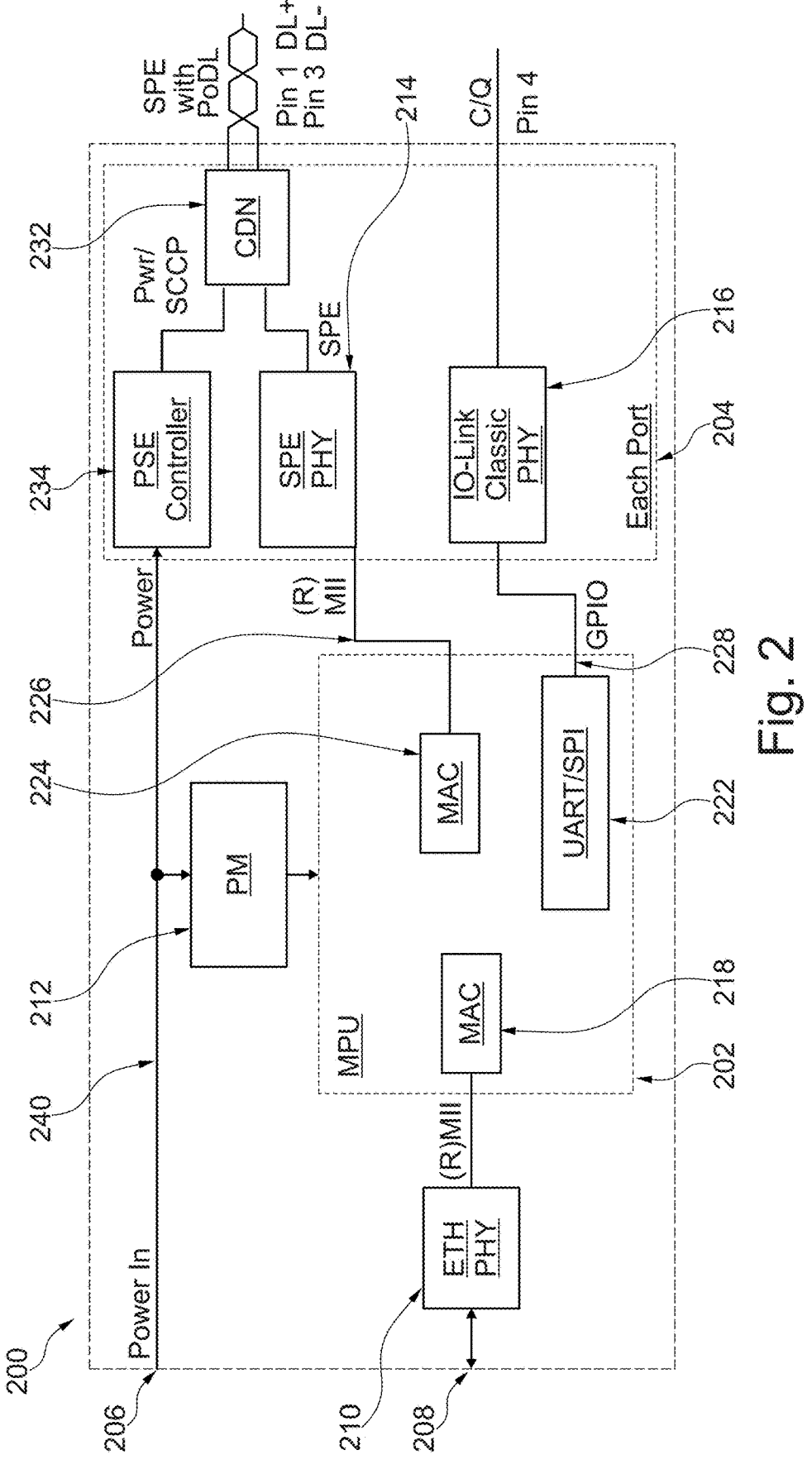
FIG. 2 shows a sketch of the circuitry of a second exemplary implementation of the apparatus.

A sketch of the circuitry of a second exemplary implementation of the apparatus 200 is explained with reference to FIG. 2. The apparatus 200 shown here by way of example is in some parts analogous to the apparatus 100 according to the first exemplary implementation explained above with reference to FIG. 1. Functionally and/or structurally comparable elements are therefore given analogously formed reference symbols, and are not described again in detail below.

In the second exemplary implementation, a further option is implemented in which, for example, Ethernet-based communication can take place via 10BASE-TIL, with power transmission via "PoDL class 11/12" or a similar standard for transmission of electrical power over the same lines as for the data transmission and simultaneously with the data transmission.

In the apparatus 200 shown, which is likewise used as an IO-Link master, no switchover is provided as implemented by the switching element 130 in the previously explained first exemplary implementation. Instead, a conductor pair for SPE/PoDL and additionally an electrical power supply for classical IO-Link can be provided via "Pin 1" and "Pin 3".

The apparatus 200 basically has a similar design to the apparatus 100 of the first exemplary implementation shown in FIG. 1. It comprises a power input 206 for the supply of electrical power ("Power In"), a control interface 208 for connecting to a higher-level control system 400 via a databus 410, and a physical layer ETH-PHY 208, via which the interface to the databus 410 is implemented. The apparatus 200 of the second exemplary implementation further comprises a field-device port 204, which is shown by conductors or pins P1, P3, P4. A control unit MPU 202 is provided, which optionally is in the form of an Ethernet switch and is configured for the described functionalities of the apparatus 200. In addition, a PMIC module 212 (power management, PM) is connected via a line 240 to the control unit "MPU" 202 and to the power supply "Power In" 206. The supply of power to a connected field device, for instance shown in FIG. 3 as a field device F1, F2, F3, Fn, can be controlled via the PMIC module 212, which in addition can be controlled via the control unit MPU 202. For each field-device port 204 or port of the apparatus 200 at least one physical layer "IO-Link Classic PHY" 216 for ground-referenced communication signals and one physical layer "SPE PHY" 214 for non-ground-referenced communication signals are provided. Optionally, the physical layer ",SPE PHY" 214 of each port 204 is connected via an (R) MII interface 226 (reduced media-independent interface, RMII) to a MAC module 224 assigned to the port 204. The physical layer ",IO-Link Classic PHY" 216 is connected via a GPIO interface 228 (General Purpose Input/Output) to the UART/SPI module 222 of the control unit MPU 202.

Unlike the first exemplary implementation, for the apparatus 200, the "Pin 4" for each field-device port 204 is configured as "C/Q" and connected directly to the physical layer "IO-Link Classic PHY" 216.

In addition, for each field-device port 204 is provided a CDN module 232, which is connected to "Pin 1" and "Pin 3", via which SPE with PoDL can be provided in the case of non-ground-referenced communication, or via which can be provided a power supply in the case of ground-referenced communication.

The CDN module is coupled to a PSE controller module 234 and to the physical layer "SPE PHY" 214. The PSE controller module 234 is in turn coupled via a line 240 to the power input 206.

In this case, a connected field device F1, F2, F3, Fn can be supplied with both electrical power and communication via a conductor pair "Pin 1" and "Pin 3".

In the case shown, "Pin 1" and "Pin 3" are driven in such a way that via these pins can take place—in addition to the supply of power—also (non-ground-referenced) communication via Single Pair Ethernet (SPE). It is thus possible to implement SPE with PODL.

This is in contrast to classic IO master devices for ground-referenced communication via IO-Link, because said known devices provide only an electrical power supply via Pins 1 and 3.

In the exemplary implementation shown, the pin "Pin 4" for "C/Q" continues to be reserved for use with classical IO-Link devices, i.e. for ground-referenced communication. If a field device F1, F2, F3, Fn for use with SPE/PoDL is connected, then this pin can be switched off or it can be ignored by the field device or a plug for connecting a field device F1, F2, F3, Fn for SPE/PoDL can be designed such that Pin 4 is not conductively connected to the field device.

The IO-Link master 200 of the exemplary implementation can use for the data transmission either "Pin 4" in order to communicate with a classical IO-Link device, or a newer, more modern IO-Link-via-Ethernet device via SPE can be connected via the conductor pair of the pins "Pin 1" and "Pin 3" for data exchange and for supplying power.

In both cases, the supply of electrical power is made via "Pin 1" and "Pin 3"; in the case of the classical IO-Link, 24V and GND are typically used; in the case of PoDL or SPE/PoDL are used the circuits specified therefor. In the case of classic IO-Link, the CDN can be bridged by the microprocessor unit MPU using switching elements in order to establish the ground reference required for data transmission via "Pin 4". The supply (Pwr) from the PSE can be routed directly to "Pins 1 and 3".

An example of a network comprising a higher-level control system 400, an apparatus 300 and field devices F1, F2, F3, Fn is explained with reference to FIG. 3.

FIG. 3 is highly schematic and shows the higher-level control system 400, which is connected to the apparatus 300 via a databus 410.

An additional electrical power supply to the apparatus 300 can be provided, but is not shown here.

In the example, the apparatus 300 is in the form of or includes an IO master and Ethernet switch 302.

It has ports 310, 320, 330, 380, which are each coupled to respective field devices F1, F2, F3, Fn.

The apparatus 300 has the design described herein and facilitates a connection between the higher-level control system 40 and the field devices F1, F2, F3, Fn, optionally with these being used as IO-Link devices.

It is possible to connect to the same apparatus 300 those field devices F1, F2, F3, Fn that are set up for non-ground-referenced communication, for example by means of SPE, and also field devices F1, F2, F3, Fn that are set up for ground-referenced communication, for example by means of classical IO-Link.

Depending on the design of the apparatus 300, in addition an electrical power supply can be provided via SPE/PoDL, or a separate power supply, optionally in the case of SPE without PODL.

A mix of different field devices F1, F2, F3, Fn can also be connected, and operated by the same IO master 302.

LIST OF REFERENCE SYMBOLS

100 apparatus, IO-Link master
102 microprocessor, control unit MPU; Ethernet switch
104 field-device port, port
106 power input
108 control interface (Ethernet)
110 physical layer "ETH PHY"

112 PM module (Power Management)
114 physical layer "SPE PHY" (non-ground-referenced)
116 physical layer "IO-Link Classic PHY" (ground-referenced)
118 MAC module
122 UART or SPI module (Universal Asynchronous Receiver Transmitter or Serial
Peripheral Interface)
124 MAC module
126(R) MII interface [(Reduced) Media-Independent Interface]
128 GPIO interface (General Purpose Input/Output)
130 switching element
140 line
Pin 1 pin
Pin 2 pin
Pin 3 pin
Pin 4 pin
200 apparatus, IO-Link master
202 microprocessor, control unit MPU; Ethernet switch
204 field-device port, port
206 power input
208 control interface (Ethernet)
210 physical layer "ETH PHY"
212 PM module (Power Management)
214 physical layer SPE PHY (non-ground-referenced)
216 physical layer IO-Link Classic PHY (ground-referenced)
218 MAC module
222 UART or SPI module (Universal Asynchronous Receiver Transmitter or Serial
Peripheral Interface)
224 MAC module
226(R) MII interface [(Reduced) Media-Independent Interface]
228 GPIO interface (General Purpose Input/Output)
232 CDN module (Coupling/Decoupling Network)
234 PSE controller module (Power Sourcing Equipment Controller)
240 line
300 apparatus
302 IO master and Ethernet switch
310 port
320 port
330 port
380 port
400 higher-level control system
410 databus, Ethernet connection
F1 field device
F2 field device
F3 field device
Fn field device

What is claimed is:

1. An apparatus for connecting a field device to a control system, the apparatus comprising:
    a control interface for establishing a data connection to the control system;
    a field-device port for establishing a connection to the field device for data transmission and power transmission, the field-device port having at least three pins;
    a microprocessor;
    a physical layer for ground-referenced communication signals; and
    a further physical layer for non-ground-referenced communication signals;

wherein the field-device port is designed such that the field device can be connected for ground-referenced communication signals and for non-ground-referenced communication signals.

2. The apparatus according to claim 1, the apparatus further comprising:

a switching element provided to switch between the physical layer for ground-referenced communication signals and the further physical layer for non-ground-referenced communication signals;

wherein the apparatus is designed to drive the switching element according to a received communication signal and/or a plug used for the field-device port and/or received communication data and/or a type of supply to the field-device, such that the switching element switches either to the physical layer for ground-referenced communication signals or to the physical layer for non-ground-referenced communication signals.

3. The apparatus according to claim 1, wherein the apparatus is designed to supply the field device with electrical power via a first conductor pair, and to establish the data connection via a second conductor pair.

4. The apparatus according to claim 1, wherein the apparatus is designed to supply the field device with electrical power via a first conductor pair, and wherein the apparatus is designed to establish the data connection likewise via the first conductor pair.

5. The apparatus according to claim 1, wherein the field-device port comprises a plug socket designed for mechanically and conductively connecting to a plug;

wherein the plug socket has at least four pins comprising two pins for data transmission and two pins for power transmission;

wherein the plug socket is also suitable for two-pin connection to a Single Pair Ethernet plug for a twisted-pair cable of Single Pair Ethernet, wherein the Single Pair Ethernet plug is designed to be conductively connected to the two pins for communication; and wherein the plug socket is designed to be form-fittingly connected to an IO-Link plug.

6. The apparatus according to claim 2, wherein the switching element is connected via a line directly to the microprocessor, wherein the microprocessor is designed to control a function of the switching element according to the received communication signal and/or the plug used and/or the received communication data and/or the supply type to the field device.

7. The apparatus according to claim 3, wherein the field-device port is designed to supply the field device with electrical power via two pins.

8. The apparatus according to claim 3, wherein the field-device port is designed to connect two further pins as C/Q for ground-referenced communication signals, or as DL+ and DL− for non-ground-referenced communication signals.

9. The apparatus according to claim 4, wherein the apparatus is designed to establish for ground-referenced communication signals the data connection via a further conductor.

10. The apparatus according to claim 4, wherein the apparatus is designed to drive the first conductor pair such that the field device can be supplied with electrical power by a voltage of 24 V and GND in a case of ground-referenced communication signals, and by means of Power over Dataline or via Single Pair Ethernet/Power over Dataline in a case of non-ground-referenced communication signals.

11. The apparatus according to claim 6, wherein the microprocessor is conductively connected via the line directly to a pin, and/or the field-device port comprises a plug socket in a form of an IO-Link plug socket in accordance with standard 61131-9.

12. A kit of parts comprising an IO-Link plug socket and a plug, wherein the IO-Link plug socket is a field-device port for establishing a connection to a field device for data transmission and power transmission, has a four-pin design and is in accordance with the IO-Link standard, having at least one pin for ground-referenced data transmission and two pins for power transmission, wherein the plug is a Single Pair Ethernet plug for a twisted-pair cable of Single Pair Ethernet having a two-pin design, and wherein the plug is designed to be conductively connected to the two pins for power transmission of the IO-Link plug socket, wherein the field-device port is designed such that the field device can be connected for ground-referenced communication signals and for non-ground-referenced communication signals.

13. A method for operating an apparatus for connecting a field device to a control system, the apparatus including:

a control interface for establishing a data connection to the control system;

a field-device port for establishing a connection to the field device for data transmission and power transmission, the field-device port having at least three pins;

a microprocessor;

a physical layer for ground-referenced communication signals; and a further physical layer for non-ground-referenced communication signals;

wherein the field-device port is designed such that the field device can be connected for ground-referenced communication signals and for non-ground-referenced communication signals, the method comprising:

establishing a data connection of the apparatus to the control system via the control interface;

connecting the field device to the apparatus via a plug-in connection, the plug-in connection comprising the field-device port of the apparatus and a plug, by a cable for data transmission and power transmission between the apparatus and the field device;

recognizing a type of communication signals that is designed to be used for the field device; and adjusting, according to the recognition, the apparatus for data transmission using the physical layer for ground-referenced communication signals or using the physical layer for non-ground-referenced communication signals.

* * * * *